(12) United States Patent
Zhuang et al.

(10) Patent No.: US 10,534,837 B2
(45) Date of Patent: Jan. 14, 2020

(54) APPARATUS AND METHOD OF LOW COMPLEXITY OPTIMIZATION SOLVER FOR PATH SMOOTHING WITH CONSTRAINT VARIATION

(71) Applicant: Samsung Electronics Co., Ltd., Gyeonggi-do (KR)

(72) Inventors: Binnan Zhuang, San Diego, CA (US); Dongwoon Bai, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/016,256

(22) Filed: Jun. 22, 2018

(65) Prior Publication Data

US 2019/0147013 A1 May 16, 2019

Related U.S. Application Data

(60) Provisional application No. 62/585,187, filed on Nov. 13, 2017.

(51) Int. Cl.
*G06F 17/12* (2006.01)
*G06F 7/58* (2006.01)
(Continued)

(52) U.S. Cl.
CPC ......... *G06F 17/12* (2013.01); *G06F 7/58* (2013.01); *G06F 17/16* (2013.01); *G06T 5/002* (2013.01);
(Continued)

(58) Field of Classification Search
CPC ... G06F 17/12; G06F 7/58; G06T 7/85; G06T 7/285; G06T 5/002; H04N 13/282; H04N 5/23248; G06G 17/16
(Continued)

(56) References Cited

U.S. PATENT DOCUMENTS 8,102,428 B2   1/2012 Agarwala et al.
8,290,297 B2  10/2012 Brand
(Continued)

FOREIGN PATENT DOCUMENTS

CN    106101535   11/2016
CN    106130066   11/2016
WO  WO 2011/018121  2/2011

OTHER PUBLICATIONS

Matthias Grundmann et al., "Auto-Directed Video Stabilization with Robust L1 Optimal Camera Paths", 2011 IEEE Conference on CVPR, pp. 225-232, IEEE, 2011.
(Continued)

*Primary Examiner* — Tan V Mai
(74) *Attorney, Agent, or Firm* — The Farrell Law Firm, P.C.

(57) ABSTRACT

An apparatus and method of low complexity optimization solver for path smoothing with constraint variation are herein disclosed. According to one embodiment, an apparatus includes an L1 controller configured to receive a raw data series z to be smoothed, where L1 represents a formulation based on L1 norm cost, receives weights $w_0$, $w_1$, $w_2$, and $w_3$ to control smoothness of an output path, and formulate an L1 trend filtering problem; an L1 central processing unit (CPU) connected to the L1 controller and configured to transform the L1 trend filtering problem to a primal-dual linear programming (LP) optimization problem pair; and an L1 arithmetic logic unit (ALU) connected to the L1 CPU and configured to solve a primal problem of the primal-dual problem pair with an extended full tableau simplex method.

20 Claims, 7 Drawing Sheets

(51) Int. Cl.
| | |
|---|---|
| *G06F 17/16* | (2006.01) |
| *G06T 7/80* | (2017.01) |
| *G06T 7/285* | (2017.01) |
| *H04N 13/282* | (2018.01) |
| *G06T 5/00* | (2006.01) |
| *H04N 5/232* | (2006.01) |
| *H04N 13/204* | (2018.01) |

(52) U.S. Cl.
CPC ............... *G06T 7/285* (2017.01); *G06T 7/85* (2017.01); *H04N 5/23248* (2013.01); *H04N 13/282* (2018.05); *G06T 2200/04* (2013.01); *G06T 2207/10021* (2013.01); *H04N 13/204* (2018.05)

(58) Field of Classification Search
USPC .......................................... 708/201, 300–323
See application file for complete search history.

(56) References Cited

U.S. PATENT DOCUMENTS

| | | | |
|---|---|---|---|
| 8,924,331 | B2 | 12/2014 | Pekar et al. |
| 9,197,736 | B2 | 11/2015 | Davis et al. |
| 9,635,261 | B2 | 4/2017 | Grundmann et al. |
| 2003/0090593 | A1 | 5/2003 | Xiong |
| 2015/0248916 | A1 | 9/2015 | Kopf et al. |
| 2017/0083608 | A1 | 3/2017 | Ye et al. |
| 2017/0278219 | A1 | 9/2017 | Yuan et al. |

OTHER PUBLICATIONS

Sanjay Mehrotra, Sanjay, "On The Implementation of a Primal-Dual Interior Point Method," SIAM Journal on optimization 2, No. 4 (1992): 575-601.
Alexandre Karpenko et al., "Digital Video Stabilization and Rolling Shutter Correction using Gyroscopes", Stanford Tech Report CTSR, 2011, pp. 1-7.
Seung-Jean Kim et al., "Trend Filtering", SIAM Review, vol. 51, No. 2, 2009, pp. 339-260.
Dimitris Bertsimas et al., "Introduction to Linear Optimization." vol. 6. Athena Scientific, 1997, Chapter 3: The Simplex Method, pp. 81-138.
Dimitris Bertsimas et al., "Introduction to linear optimization." vol. 6. Athena Scientific, 1997, Chapter 5: Sensitivity Analysis, pp. 201-229.
Dimitris Bertsimas et al., "Introduction to linear optimization." vol. 6. Belmont, MA: Athena Scientific, 1997, Chapter 6: Dual Methods, pp. 601-659.

APPARATUS AND METHOD OF LOW COMPLEXITY OPTIMIZATION SOLVER FOR PATH SMOOTHING WITH CONSTRAINT VARIATION

PRIORITY

This application claims priority under 35 U.S.C. § 119(e) to a U.S. Provisional Patent Application filed on Nov. 13, 2017 in the U.S. Patent and Trademark Office and assigned Ser. No. 62/585,187, the entire contents of which are incorporated herein by reference.

FIELD

The present disclosure relates generally to an optimization solver, and more particularly, to an apparatus and a method of low complexity optimization solver for path smoothing with constraint variation.

BACKGROUND

Path optimization (also known as trend filtering) aims at finding an optimal path based on a raw path, which minimizes a cost as a function of both the raw path and the optimal path to be computed. Path optimization has wide application, including robotics, aviation, and finance. For example, path optimization may be used to smooth a shaking raw camera path for video stabilization.

Linear programming (LP) is a mathematical technique for maximizing or minimizing a linear function of several variables, such as output or cost. Quadratic programming (QP) is a process of solving a special type of mathematical optimization problem—specifically, a (linear constrained) quadratic optimization problem, that is, the problem of optimizing (minimizing or maximizing) a quadratic function of several variables subject to linear constraints on these variables.

SUMMARY

According to one embodiment, an apparatus is provided. The apparatus includes an L1 controller configured to receive a raw data series z to be smoothed, where L1 represents a formulation based on L1 norm cost, receives weights $w_0$, $w_1$, $w_2$, and $w_3$ to control smoothness of an output path, and formulate an L1 trend filtering problem; an L1 central processing unit (CPU) connected to the L1 controller and configured to transform the L1 trend filtering problem to a primal-dual LP optimization problem pair; and an L1 arithmetic logic unit (ALU) connected to the L1 CPU and configured to solve a primal problem of the primal-dual LP optimization problem pair with an extended full tableau simplex method.

According to one embodiment, a method is provided. The method includes receiving, by an L1 controller, where L1 represents a formulation based on L1 norm cost, a raw data series z to be smoothed, receiving weights $w_0$, $w_1$, $w_2$, and $w_3$ to control smoothness of an output path, and formulating an L1 trend filtering problem; transforming, by an L1 CPU connected to the L1 controller, the L1 trend filtering problem to a primal-dual LP problem pair; and solving, by an L1 ALU connected to the L1 CPU, a primal problem of the primal-dual pair with an extended full tableau simplex method.

According to one embodiment, an apparatus is provided. The apparatus includes an L2 controller configured to receive a raw data series z to be smoothed, where L2 represents a formulation based on L2 norm cost, receives weights $w_0$, $w_1$, $w_2$, and $w_3$ to control smoothness of an output path, and formulate an L2 trend filtering problem; an L2 CPU connected to the L2 controller and configured to derive a QP problem through dual transformation; and an L2 ALU connected to the L2 CPU and configured to solve the QP problem using an alternating direction method of multipliers (ADMM) based solution with closed-form updates.

According to one embodiment, a method is provided. The method includes receiving, by an L2 controller, where L2 represents a formulation based on L2 norm cost, a raw data series z to be smoothed; receiving, by the L2 controller, weights $w_0$, $w_1$, $w_2$, and $w_3$ to control smoothness of an output path; formulating, by the L2 controller, an L2 trend filtering problem; deriving, by an L2 CPU connected to the L2 controller, a QP problem through dual transformation; and solving, by an L2 ALU connected to the L2 CPU, the QP problem using an ADMM based solution with closed-form updates.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
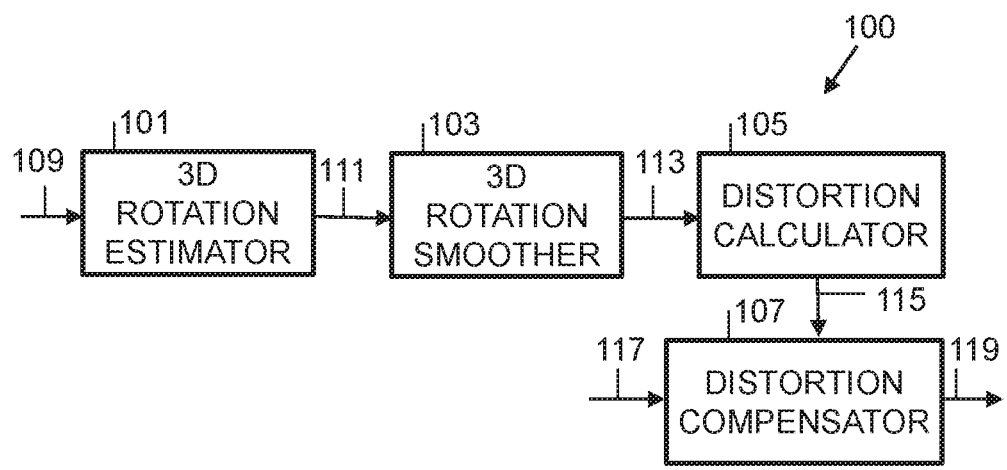
FIG. 1 illustrates a block diagram of a gyroscope-based three-dimensional (3D) video stabilization system, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC). According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. According to one embodiment, one or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

In an embodiment, a low complexity solver is described below for path optimization using an L1 norm. A norm is a function that assigns a strictly positive length or size to each vector in a vector space, except the zero vector, which is assigned a length of zero. L1 represents a formulation based on L1 norm cost and L2 represents a formulation based on L2 norm cost. The L1 norm cost measures a sum of absolute differences between a target value and estimated values. A solver that uses the L1 norm cost (L1 solver) uses a special structure of path optimization and achieves significant complexity reduction as compared with using a standard LP solver.

In an embodiment, a low complexity solver is described below for path optimization using an L2 norm. The L2 norm cost measures a sum of a square of differences between a target value and estimated values. A solver that uses the L2 norm cost (L2 solver) uses a special structure of path optimization and achieves significant complexity reduction as compared with using a standard QP solver.

In an embodiment, a solver may be used to smooth a shaking raw camera path for video stabilization. For real-time implementation, an efficient solver with low computational cost is desired for a video stabilization system implemented on smart phones. However, the present disclosure is not limited to smoothing a shaking raw camera path for video stabilization.

Video stabilization removes undesired motion jitter and reconstructs an original shaking video to a stabilized video that satisfies the cinematographic perception of general viewers. There are two main categories of stabilization techniques, namely, optical image stabilization (OIS) and digital image stabilization (DIS). OIS is usually achieved by mechanically moving a camera lens or sensor based on instantaneous camera movements measured by a gyroscope. Thus, unwanted motions are removed before images are recorded. DIS removes unwanted motions after images are recorded. In DIS, camera motion across multiple frames may be estimated (e.g., an estimated raw path). A smoothed path is then determined based on the estimated raw path using a path optimizer. Through an image warping process, a video may be corrected as if a camera that recorded the video was moving along a smoothed path. The present disclosure may be applied to DIS, but the present disclosure is not limited thereto.

In an embodiment, there are two parts, i.e., an extended full tableau simplex based LP solver for solving a path smoothing problem using an L1 norm cost function, and an ADMM based QP solver for solving a path smoothing problem using an L2 norm cost function. The L1 norm based path smoothing problem may be converted into a standard LP equation. In an embodiment, a dual equation of the standard LP equation is considered, and an extended full tabular realization of the simplex method is provided, which may be seamlessly applied with a warm-start method to achieve significant complexity reduction. The L2 norm based path optimization problem may be transformed into a QP problem with box constraints through dual analysis. By utilizing the special structure of the QP problem, an ADMM based method is provided, which includes a closed-form update in each iteration. Hence, the ADMM based QP solver is more efficient than alternative solutions.

An extended full tableau based simplex method reduces computational complexity and improves numerical stability. A low complexity LP solver solves an L1 norm based path smoothing problem in the dual domain using an extended full tabular simplex method with warm-start. An ADMM based method solves a QP problem with box constraint, which only uses closed-form updates in iterations. A low complexity QP solver solves an L2 norm based path smoothing problem using an ADMM based iterative method with warm-start.

An extended simplex based LP solver for L1 norm based path smoothing provides advantages. For example, an LP formulation derived from a dual domain is more suitable to work with a warm-start method for speeding up convergence. The extended full tabular based simplex method further simplify the computation in each iteration and improves numerical stability.

An ADMM based QP solver for L2 norm based path smoothing provides advantages. For example, a QP problem derived from the dual domain minimizes the number of variables to be optimized. The ADMM based iterative equation simplifies the update in each iteration to a closed-form calculation. By utilizing a warm-start method for convergence speed up, the ADMM based QP solver is more efficient than conventional QP solvers.

Solvers using a camera path smoothing equation in video stabilization are described below. However, the solvers may be applied to a more general optimization problem taking similar forms.

A camera path smoothing problem may be formulated as minimizing the cost function in Equation (1) in each frame:

$$J(y)=w_0 d(y,z)+w_1\|D_1 y\|_1^1+w_2\|D_2 y\|_1^1+w_3\|D_3 y\|_1^1, \quad (1)$$

where z is a raw camera path input and y is a smoothed camera path to be optimized. The $D_l$ matrices are differential matrices of different orders as in Equations (2), (3) and (4):

$$D_1 = \begin{bmatrix} 1 & -1 & & \\ & 1 & -1 & \\ & & \ddots & \\ & & 1 & -1 \end{bmatrix}, \quad (2)$$

$$D_2 = \begin{bmatrix} 1 & -2 & 1 & & \\ & 1 & -2 & 1 & \\ & & \ddots & \ddots & \\ & & 1 & -2 & 1 \end{bmatrix}, \quad (3)$$

$$D_3 = \begin{bmatrix} 1 & -3 & 3 & 1 & \\ & 1 & -3 & 3 & 1 \\ & & \ddots & \ddots & \ddots \\ & & 1 & -3 & 3 & 1 \end{bmatrix}. \quad (4)$$

The three orders of derivatives are sufficient to capture the dynamics of a camera. For other applications, a different number of orders may be selectively determined with modification. The d(y,z) term represents a distance between a raw camera path and a stabilized camera path. In an embodiment, both an L1 distance $\|y-z\|$ and an L2 distance $\|y-z\|_2^2$ are considered. In each video frame, there may be one input vector z for each dimension of the raw camera path. For example, if the raw camera path models 3D rotation of a camera, three path optimization equations are solved independently for each dimension of the 3D rotation path. The description below concerns a single dimension. An input vector includes path values in previous $a_1$ frame, a current frame, and future $a_2-1$ frames.

The optimization problem is as in Equation (5):

$$\hat{y} = \underset{z-r_{th} \le y \le z+r_{th}}{\mathrm{argmin}} J(y), \quad (5)$$

where a threshold vector $r_{th}$ is added to constrain the optimized path within the proximity of the raw camera path. Another consistency constraint may be added to enforce that the previously optimized path cannot be changed in the current update as in Equation (6):

$$(\hat{y}_1, \ldots, \hat{y}_{k_{current}-1}) = (\hat{y}_{pre,1}, \ldots, \hat{y}_{pre,k_{current}-1}), \quad (6)$$

where $(\hat{y}_{pre,1}, \ldots, \hat{y}_{pre,k_{current}-1})$ is an estimated result from previous frames.

For an LP problem based on an L1 norm, the optimization problem in Equation (5) above is an LP problem if $d(y,z)=\|y-z\|_1^1$. By introducing slack variables $e_0 \triangleq |y-z|$, $e_1 \triangleq |D_1 y|$, $e_2 \triangleq |D_2 y|$, and $e_3 \triangleq |D_3 y|$, where |x| indicates taking an elementwise absolute value of vector x, Equation (5) above may be converted to an LP problem in Equations (7) and (8):

$$\min_{\tilde{y}} w_0 1^T e_0 + w_1 1^T e_1 + w_2 1^T e_2 + w_3 1^T e_3, \text{s.t. } A^T \tilde{y} \leq c, \quad (7)$$

$$A^T = \begin{bmatrix} -I & 0 & 0 & 0 & I \\ -I & 0 & 0 & 0 & -I \\ 0 & -I & 0 & 0 & D_1 \\ 0 & -I & 0 & 0 & -D_1 \\ 0 & 0 & -I & 0 & D_2 \\ 0 & 0 & -I & 0 & -D_2 \\ 0 & 0 & 0 & -I & D_3 \\ 0 & 0 & 0 & -I & -D_3 \\ 0 & 0 & 0 & 0 & I \\ 0 & 0 & 0 & 0 & -I \end{bmatrix}, \quad (8)$$

$$c = \begin{bmatrix} z \\ -z \\ 0 \\ 0 \\ 0 \\ 0 \\ 0 \\ 0 \\ z + r_{th} \\ -z + r_{th} \end{bmatrix},$$

$$\tilde{y} = \begin{bmatrix} e_0 \\ e_1 \\ e_2 \\ e_3 \\ y \end{bmatrix},$$

where where I and 0 are an identity matrix and a zero matrix of proper size; and 1 is a vector with all ones. Minimizing each L1 norm term $\beta = |\alpha|$ is transformed into minimizing $\beta$ with two inequality constraints $-\beta \leq \alpha \leq \beta$. Consistency is enforced with previously optimized values in Equation (6) above by removing some columns and rows of $A^T$ and updating c using previously optimized values.

A dual problem that is solved by the extended full tableau simplex is described below. Any LP problem may be transformed into a standard form as in Equation (9):

$$\min_x c^T x \quad (9)$$
$$\text{s.t. } Ax = b$$
$$x \geq 0,$$

whose dual problem may be shown to be Equation (10):

$$\max_y b^T y \quad (10)$$
$$\text{s.t. } A^T y + s = c$$
$$s \geq 0,$$

where the dimension of A is m×n, with m≤n in general, i.e., A is a fat matrix. The LP equation may be transformed to either primal or dual forms. However, transformation to the primal form in Equation (9) above requires more slack variables than directly fitting Equation (7) above into the dual domain. Therefore, Equation (7) above may be treated as a dual equation and the corresponding primal problem may be solved. This may be achieved by setting $b^T = -[w_0 1^T, w_1 1^T, w_2 1^T, w_3 1^T]$, $y = \tilde{y}$ and using the same $A^T$ and c from Equation (7) above. According to the duality theorem, the optimal solutions to problems (9) and (10) above will satisfy $c^T x^* = y^{*T} b$.

In the present disclosure, an improvement to the simplex algorithm is disclosed that reduces computational complexity and improves numerical stability.

A solution to the primal problem (9) above is the so called basic feasible solution. A solution x* is a basic feasible solution if (a) all equality constraints are active and (b) out of the active constrains, there are n of the active constraints that are linearly independent. A basic feasible solution only has m nonzero elements out of the n values. The nonzero part of a basic feasible solution is Equation (11):

$$x_b = B^{-1} b, \quad (11)$$

where basis matrix B includes m independent columns of A, i.e., $B = [A_{B(1)}, \ldots, A_{B(m)}]$. In this case, $B(1), \ldots, B(m)$ are the corresponding column indices and $A_{B(i)}$ denotes one column of A that is in the basis of the basic feasible solution. The corresponding basic feasible solution is obtained by adding zeros to the other coordinates that are not in the basis. In each simplex iteration, a column $A_j$ of A is sought which is not in B to substitute one of the columns $A_{B(l)}$, which is currently in B. By doing so, a new basis matrix becomes $\bar{B} = [\ldots A_{B(l-1)}, A_j, A_{B(l+1)} \ldots]$. The nonzero part of the new basic feasible solution is given by $\tilde{x}_b = \bar{B}^{-1} b$. The simplex method essentially travels from one extreme point to another extreme point with reduced cost in each iteration. The simplex method stops after there is no entering column that can reduce the cost. y* is the solution to the dual equation, which may be calculated by $y^* = [B^{-1}]^T c_B$ using the matrix B that includes the optimal basis found by the simplex method.

The most computationally intensive part of the simplex method is calculating $B^{-1}$. In an embodiment, an extended full tableau simplex method is used for a more efficient implementation of the simplex method. That is, a row operation based update is used to realize the simplex update in each iteration by updating the following extended full tableau in Table 1:

TABLE 1

| $-c_B^T B^{-1} b$ | $c - c_B^T B^{-1} A$ | $-c_B^T B^{-1}$ |
|---|---|---|
| $B^{-1} b$ | $B^{-1} A$ | $B^{-1}$ |

The extended full tableau in Table 1 above is an extension of the full tableau simplex method and is described below in greater detail.

An iteration starts with an extended full tableau associated with a basis matrix B and a corresponding basic feasible solution x.

The reduced costs $c - c_B^T B^{-1} A$ in the 0th row of the extended full tableau is examined. If the reduced costs $c - c_B^T B^{-1} A$ are all nonnegative, the current basic feasible solution is optimal, and the method terminates. Otherwise, a j for which $\bar{c}_j < 0$ is chosen.

For the vector $u = B^{-1} A_j$, which is a lower middle part of the j+1th column in the tableau, the method terminates if no component of u is positive.

For each i for which $u_i$ is positive, the ratio $x_{B(i)}/u_i$ is computed. l is the index of a row that corresponds to the smallest ratio, where $x_B=B^{-1}b$ may be read from a bottom left part of the extended full tableau. The column $A_{B(l)}$ exists in the basis and the column $A_J$ enters the basis.

To each row of the tableau a constant multiple of the lth row is added so that $u_l$ (e.g., the pivot element) becomes one and all other entries of the pivot column become zero.

Upon termination of the extended full tableau simplex method, the optimal dual solution is obtained through $y^*=-[-c_B^T B^{-1}]^T$, where the $-c_B^T B^{-1}$ term is the top right block of the extended full tableau. In an embodiment of the extended full tableau method, $B^{-1}A_B=B^{-1}B=I$, i.e., there is no need to perform the row operation on the mth column of $B^{-1}A$, which corresponds to the newly updated basis. Instead, the corresponding part of the block is set as an identity matrix.

A warm-start method may be used to solve for the optimal $y^*$ for consecutive frames to speed up convergence. For example, the optimal extended full tableau obtained in the previous frame may be used to initialize the extended full tableau of the current frame. Such a method is valid only if Equation (7) above is fit into the dual domain and the corresponding problem in the primal domain is solved. This is because the primal feasible set given by $Ax=b$, $x\geq 0$ does not change across frames, which guarantees the optimal solution in the previous frame is still a basic feasible solution to the LP of the current frame. Convergence accelerates because c only changes slightly in adjacent frames.

The extended full tableau simplex with warm-start also has improved numerical stability, which is very important when used to solve general path optimization problems. When warm-start is used, $B^{-1}$ is continuously updated across multiple frames. Hence, a round-off error will propagate from one frame to another. One version of the simplex method, namely, the revised simplex method, will suffer from this error propagation with warm-start. The extended full-tableau is much less sensitive to such error propagation, because, although $B^{-1}$ is updated in the full tableau, $B^{-1}$ is not directly used for any matrix multiplication.

FIG. 1 illustrates a block diagram of a gyroscope-based 3D video stabilization system, according to one embodiment. A gyroscope-based 3D video stabilization system 100 includes a 3D rotation estimator 101, a 3D rotation smoother 103, a distortion calculator 105, and a distortion compensator 107.

The 3D rotation estimator 101 includes an input 109 and an output 111. The 3D rotation estimator 101 may receive angular velocities measured by a gyroscope at the input 109 and uses the angular velocities to estimate 3D rotation of a camera and output an accumulated 3D rotation raw camera path at the output 111.

The 3D rotation smoother 103 includes an input connected to the output 111 of the 3D rotation estimator 101 and an output 113. The 3D rotation smoother 103 smoothes the 3D raw camera path received from the 3D rotation estimator 101 and outputs the 3D raw camera path and a 3D smoothed camera path at the output 113.

The distortion calculator 105 includes an input connected to the output 113 of the 3D rotation smoother 103 and an output 115 for providing a distorted grid. Using the 3D raw camera path and the 3D smoothed camera path, the distortion calculator 105 determines the distorted grid.

The distortion compensator 107 includes a first input connected to the output 115 of the distortion calculator 105, a second input 117, and an output 119. The distortion compensator 107 receives the distorted grid determined by the distortion calculator 105, receives an image sequence at the second input 117, and uses the distorted grid to compensate for 3D rotation in the image sequence.

Figure 2:
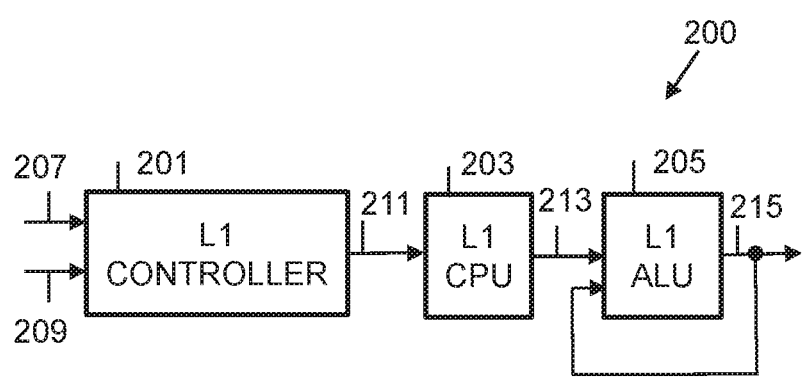
FIG. 2 illustrates an apparatus for an L1 path optimizer, according to one embodiment.

FIG. 2 illustrates an apparatus for an L1 path optimizer, according to one embodiment. An extended full tableau simplex based LP solver 200 transforms an L1 trend filtering problem to an LP primal-dual problem pair, which enables the efficient use of an extended full tabular simplex method and warm start technique.

Referring to FIG. 2, the extended full tableau simplex based LP solver 200 includes an L1 controller 201, an L1 CPU 203, and an L1 ALU 205.

The L1 controller 201 includes a first input 207 for receiving a raw data series z to be smoothed, a second input 209 for receiving selected weights $w_0$, $w_1$, $w_2$, and $w_3$ to control the smoothness of an output path, and an output 211. The L1 controller 201 formulates an L1 trend filtering problem in Equation (12):

$$\min_{z-r_{th}\leq y\leq z+r_{th}} w_0\|y-z\|_1^1 + w_1\|D_1 y\|_1^1 + w_2\|D_2 y\|_1^1 + w_3\|D_3 y\|_1^1 \quad (12)$$

The L1 CPU 203 includes an input connected to the output 211 of the L1 controller 201 and an output 213. The L1 CPU 203 transforms the L1 trend filtering problem in Equation (12) above to primal-dual problem pair.

The L1 ALU 205 includes a first input connected to the output 213 of the L1 CPU 203, an output 215, and a second input connected to the output 215. The L1 ALU 205 solves the primal problem with an extended full tableau simplex method with warm start, where a previous solution to the primal problem is used as the warm start, and outputs a smoothed path y. The operation of the L1 ALU 205 is described below in greater detail with reference to FIG. 4.

Figure 3:
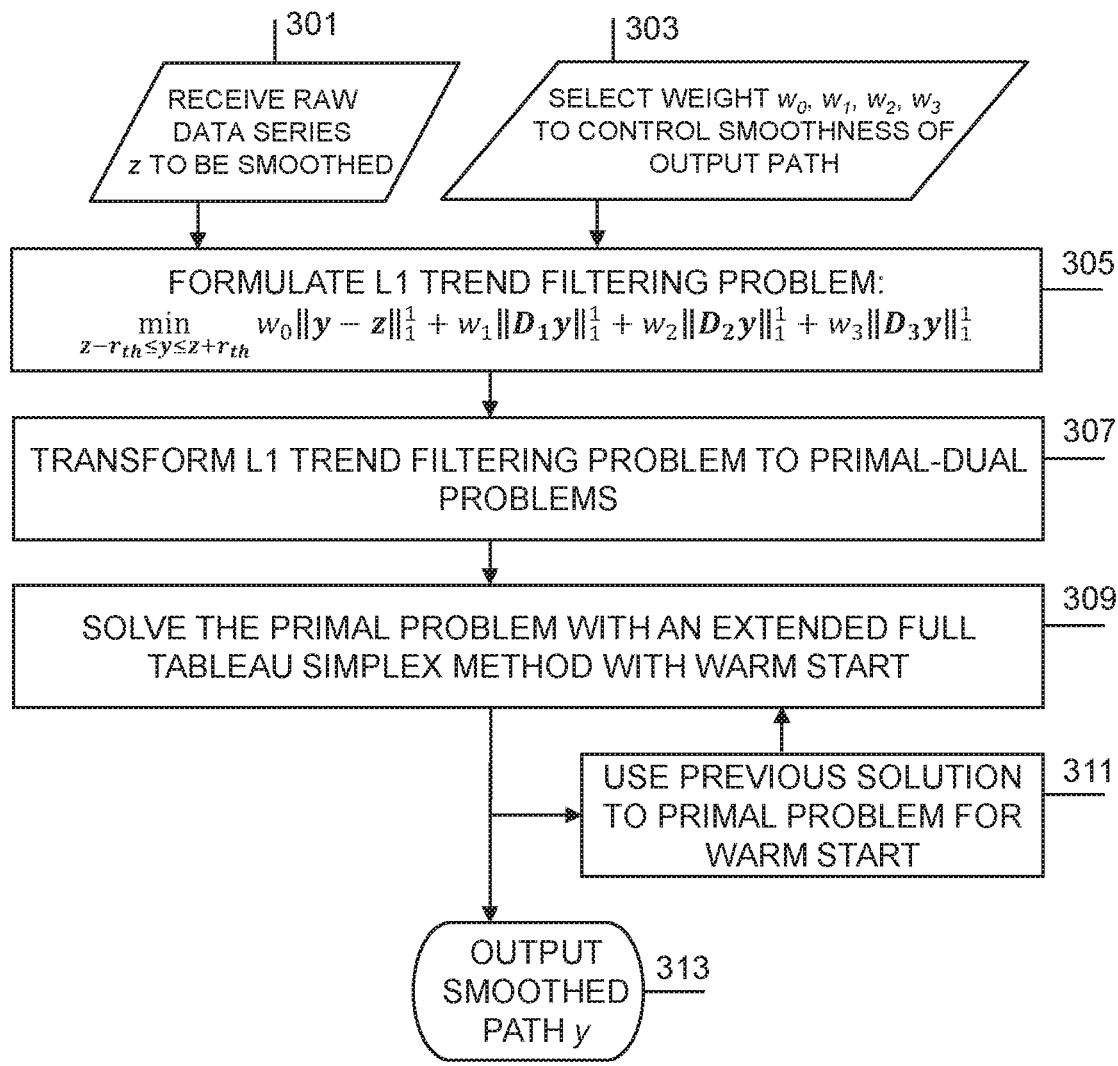
FIG. 3 illustrates a flowchart of a method of an extended full tableau simplex based LP solver, according to one embodiment.

FIG. 3 illustrates a flowchart of a method of an extended full tableau simplex based LP solver, according to one embodiment. At 301, the extended full tableau simplex based LP solver, by an L1 controller, receives a raw data series z to be smoothed. At 303, the extended full tableau simplex based LP solver, by the L1 controller, receives selected weights $w_0$, $w_1$, $w_2$, and $w_3$ to control the smoothness of an output path. At 305, the extended full tableau simplex based LP solver, by the L1 controller, formulates an L1 trend filtering problem as in Equation (12) above.

At 307, the extended full tableau simplex based LP solver, by an L1 CPU, transforms the L1 trend filtering problem in Equation (12) above to primal-dual problems. At 309, the extended full tableau simplex based LP solver, by an L1 ALU, solves the primal problem with an extended full tabular simplex method with a warm start. At 311, the extended full tableau simplex based LP solver, by the L1 ALU, uses a previous solution (e.g., the solution at 309) to the primal problem as the warm start. At 313, the extended full tableau simplex based LP solver, by the L1 ALU, outputs a smoothed path y.

Figure 4:
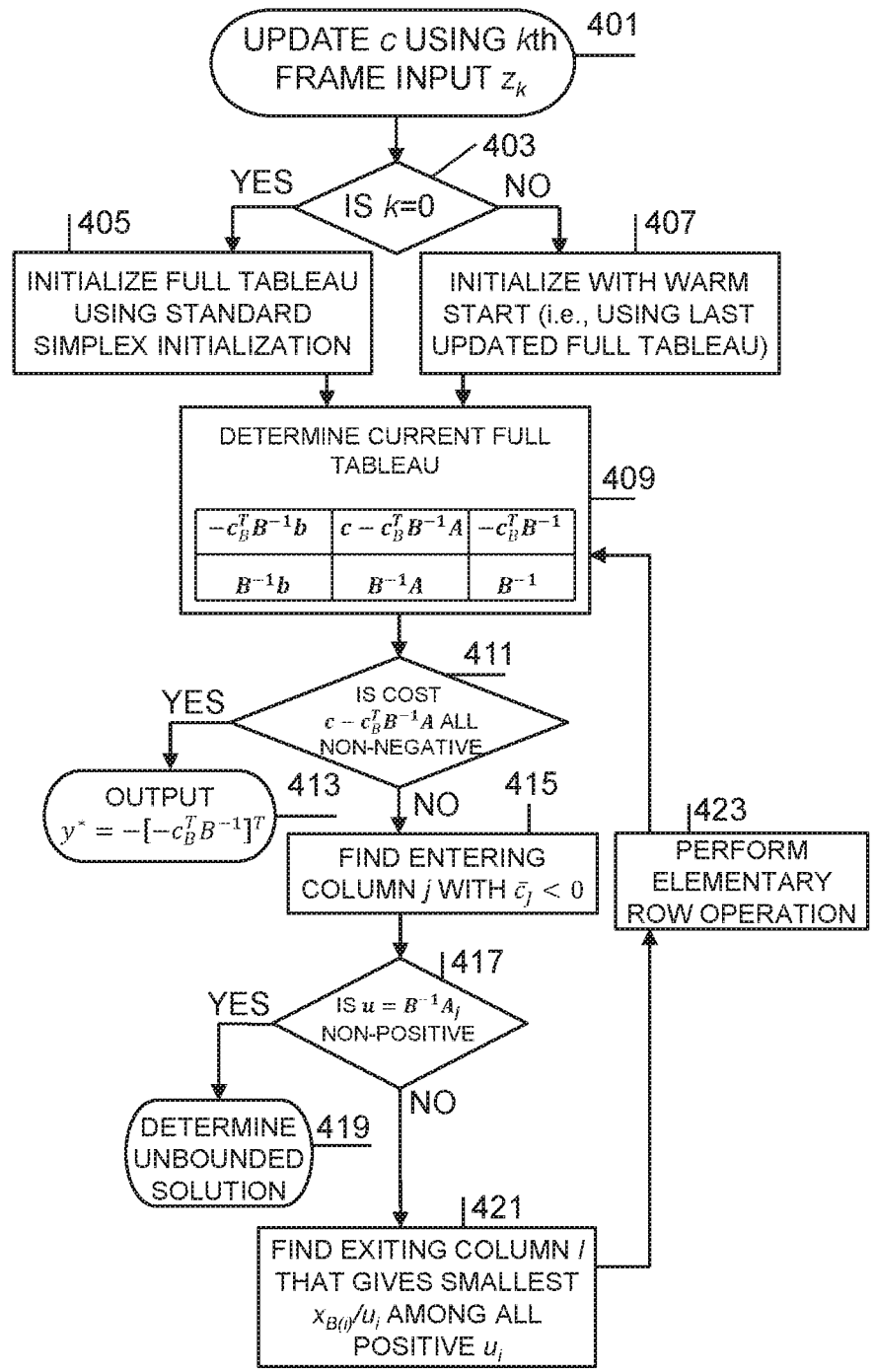
FIG. 4 illustrates a flowchart of a method of an L1 ALU, according to an embodiment.

FIG. 4 illustrates a flowchart of a method of an L1 ALU (e.g., L1 ALU 205 in FIG. 2 and step 309 in FIG. 3), according to an embodiment. At 401, the L1 ALU, updates c using a $k^{th}$ frame input $z_k$.

At 403, the L1 ALU determines if k is equal to 0. At 405, the L1 ALU initializes a full tableau using standard simplex initialization if it is determined that k is equal to 0. At 407, the L1 ALU initializes the full tableau with a warm start (e.g., using the last updated full tableau) if k is determined to not be equal to 0.

At 409, the L1 ALU determines a current full tableau. At 411, the L1 ALU determines if a cost $c - c_B^T B^{-1} A$ is all non-negative. At 413, the L1 ALU outputs $y^* = -[c_B^T B^{-1}]T$ if the cost $c - c_B^T B^{-1} A$ is determined to be all non-negative.

At 415, the L1 ALU determines an entering column j with $\bar{c}_j < 0$ if the cost $c - c_B^T B^{-1} A$ is not determined to be all non-negative. At 417, the L1 ALU determines if $u = B^{-1} A_j$ is non-positive. At 419, the L1 ALU determines an unbounded solution if $u = B^{-1} A_j$ is non-positive.

At 421, the L1 ALU determines an exiting column j that gives the smallest $x_{B(i)}/u_i$ among all positive $u_i$ if $u = B^{-1} A_j$ is not non-positive. At 423, the L1 ALU performs an elementary row operation and updates the full tableau.

A QP problem based on an L2 norm is described below. The optimization problem in Equation (5) above becomes a QP problem, if $d(y,z) = \|y-z\|_2^2$ in Equation (13):

$$\min_y w_0 \|y - z\|_2^2 + \sum_{i=1}^{3} w_i \|D_i y\|_1^1 \quad (13)$$

Equation (13) above may be transformed into a standard QP form. In this case, a dual domain transformation is performed, as the dual domain requires fewer slack variables. First, $x_i = D_i y$. Hence, Equation (13) above may be rewritten as Equation (14):

$$\min_{y, x_1, x_2, x_3} w_0 \|y - z\|_2^2 + w_1 \|x_1\|_1^1 + w_2 \|x_2\|_1^1 + w_3 \|x_3\|_1^1 \quad (14)$$

s.t. $-r_{th} \le y - z \le r_{th}$ $x_i = D_i y, \, i = 1, 2, 3$

The Lagrangian function of Equation (14) above is given by Equation (15):

$$L(y, x, v, \mu) = (y - z)^T (y - z) + \sum_{i=1}^{3} \{w_i \|x_i\|_1 + v_i^T (D_i y - x_i)\} + \mu_{lb}^T (z - r_{th} - y) + \mu_{ub}^T (y - z - r_{th}) \quad (15)$$

where $v = [v_1, v_2, v_3]^T$ are the Lagrange multipliers for $x_i = D_i y$, $i = 1, 2, 3$; and $\mu_{lb}^T$, $\mu_{ub}^T$ are the Lagrange multipliers for $-r_{th} \le y - z \le r_{th}$. Treating x as the only variable, the solution to Equation (15) above is Equation (16):

$$L(y, x^*, v, \mu) = \quad (16)$$

$$\begin{cases} (y - z)^T (y - z) + \sum_{i=1}^{3} v_i^T D_i y + \mu_{lb}^T (z - r_{th} - y) + \\ \mu_{ub}^T (y - z - r_{th}), & -w_i \le v_i \le w_i 1 \\ -\infty, & \text{otherwise} \end{cases}$$

Hence, the additional constraint $-w_i 1 \le v_i \le w_i 1$ is added. Solving for the optimal y in Equation (16) above under the constraint $-w_i 1 \le v_i \le w_i 1$ results in $L(y^*, x^*, v, \mu) = \inf_y L(y, x^*, v, \mu)$. According to the duality theory, the dual equation then becomes max $L(y^*, x^*, v, \mu)$, which may be derived as Equation (17):

$$\min_\eta \frac{1}{2} \eta^T A A^T \eta - 2(Az + B)^T \eta \quad (17)$$

s.t. $\gamma_{lb} \le \eta \le \gamma_{ub}$ where $$A = \begin{bmatrix} I \\ -I \\ D_1 \\ D_2 \\ D_3 \end{bmatrix}, \eta = \begin{bmatrix} \mu_{ub} \\ \mu_{lb} \\ v_1 \\ v_2 \\ v_3 \end{bmatrix}, \gamma_{lb} = \begin{bmatrix} 0 \\ 0 \\ -w_1 1 \\ -w_2 1 \\ -w_3 1 \end{bmatrix}, \gamma_{ub} = \begin{bmatrix} \infty \\ \infty \\ w_1 1 \\ w_2 1 \\ w_3 1 \end{bmatrix}$$

$$B = \begin{bmatrix} -z - r_{th} \\ z - r_{th} \\ 0 \\ 0 \\ 0 \end{bmatrix}.$$

Once the optimal dual solution $\eta^*$ is obtained, the primal solution may be recovered through Equation (18):

$$y^* = z - \tfrac{1}{2} A^T \eta^* \quad (18)$$

Equation (18) above is a positive semidefinite QP problem with box constraints. Some methods for solving a QP problem include, e.g., a QP interior point method and a coordinate descent method. In an embodiment, ADMM is used to solve the QP problem in Equation (17) above.

A dual solution based on ADMM is described below. Equation (17) above may be rewritten as Equation (19):

$$\min_x x^T H x + f^T x \quad (19)$$

s.t. $\gamma_{lb} \le x \le \gamma_{ub}$ where $H = AA^T$, $f = 2(Az+B)$, and $x = \eta$. An equivalent formulation is Equation (20):

$$\min_x x^T H x + f^T x \quad (20)$$

s.t. $x = y$ $\gamma_{lb} \le y \le \gamma_{ub}$

By considering the dual for constraint $x = y$, the augmented Lagrangian of Equation (20) above is Equation (21):

$$L(x, y, \alpha) = x^T H x + f^T x + \alpha^T (x - y) + \frac{\rho}{2} |x - y|^2 \quad (21)$$

where $\rho$ is a weight on a quadratic penalty. The ADMM based update for solving Equation (21) is given by Equations (22), (23), and (24):

$$y_{k+1} = \arg \min_{\gamma_{lb} \le y \le \gamma_{ub}} L(x_k, y, \alpha_k) \quad (22)$$

$$x_{k+1} = \arg\min_x L(x, y_{k+1}, \alpha_k) \quad (23)$$

$$\alpha_{k+1} = \alpha_k + \rho(x_{k+1} - y_{k+1}) \quad (24)$$

The method terminates if both the primal gap $r_p=|x_k-y_k|_2$ and the dual gap $r_d=|\rho(x_k-x_{k-1})|_2$ is below a predetermined threshold $\gamma$.

The x update, $$x_{k+1} = \underset{x}{\arg\min} L(x, y_{k+1}, \alpha_k),$$

is an unconstrained QP problem, which may be computed by Equation (25):

$$x_{k+1} = [2H+\rho I]^{-1}(\rho y_{k+1}-\alpha_k-f) \quad (25)$$

Since a fixed $\rho$ is used, the matrix inversion $[2H+\rho I]^{-1}$ may be calculated just once and reused for all iterations across all frames. The y update is essentially finding the minimum distance to the point $$x_k + \frac{1}{\rho}\alpha_k$$

under the box constraint $\gamma_{lb} \leq y \leq \gamma_{ub}$, which also has the following closed-form solution in Equation (26):

$$y_{k+1} = \left[x_k + \frac{1}{\rho}\alpha_k\right]_{\gamma_{lb}}^{\gamma_{ub}} \quad (26)$$

The ADMM based QP solver may also work with a warm-start by setting $x_0$ to an optimal solution in a previous frame. Due to a closed-form update with low complexity, the method runs much faster than conventional methods.

Figure 5:
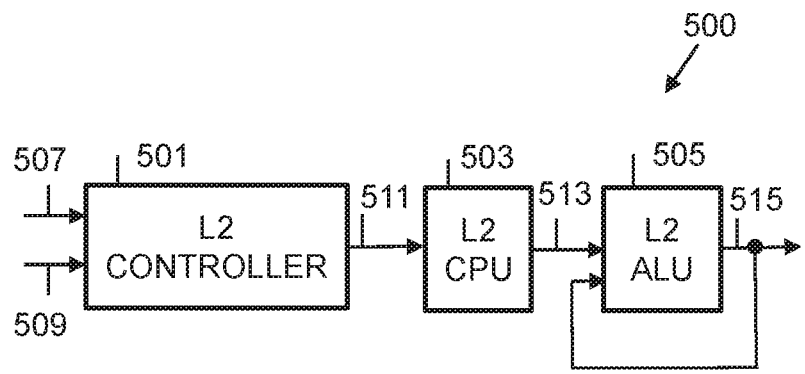
FIG. 5 illustrates an L2 path optimizer, according to one embodiment.

FIG. 5 illustrates a L2 path optimizer, according to one embodiment. A ADMM QP solver 500 includes an L2 controller 501, an L2 CPU 503, and an L2 ALU 505.

The L2 controller 501 includes a first input 507 for receiving a raw data series z to be smoothed, a second input 509 for receiving selected weights $w_0$, $w_1$, $w_2$, and $w_3$ to control the smoothness of an output path, and an output 511. The L2 controller 501 formulates an L2 trend filtering problem in Equation (27):

$$\min_{z-r_{th} \leq y \leq z+r_{th}} w_0\|y-z\|_2^2 + w_1\|D_1 y\|_1^1 + w_2\|D_2 y\|_1^1 + w_3\|D_3 y\|_1^1 \quad (27)$$

The L2 CPU 503 includes an input connected to the output 511 of the L2 controller 501 and an output 513. The L2 CPU 503 derives a QP problem through dual transformation.

The L2 ALU 505 includes a first input connected to the output 513 of the L2 CPU 503, an output 515, and a second input connected to the output 515. The L2 ALU 505 solves the QP problem using an ADMM based solution with closed-form updates with a warm start, where a previous solution of the ADMM based solution with closed-form updates is used as the warm start, and outputs a smoothed path y. The operation of the L2 ALU 505 is described below in greater detail with reference to FIG. 7.

Figure 6:
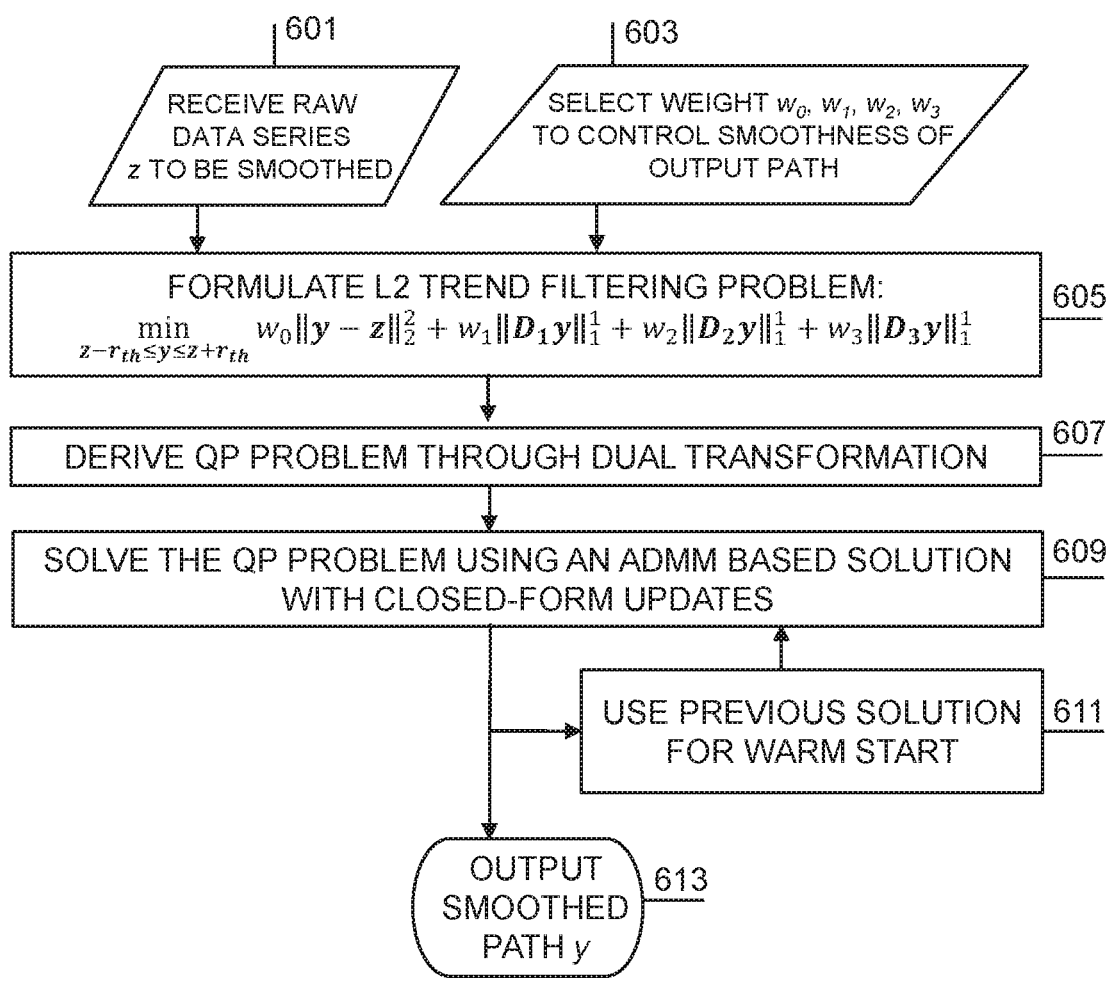
FIG. 6 illustrates a flowchart of a method of an ADMM based QP solver, according to one embodiment.

FIG. 6 illustrates a flowchart of a method of an ADMM based QP solver, according to one embodiment. At 601, the ADMM based QP solver, by an L2 controller, receives a raw data series z to be smoothed. At 603, the ADMM based QP solver, by the L2 controller, receives selected weights $w_0$, $w_1$, $w_2$, and $w_3$ to control the smoothness of an output path. At 605, the ADMM based QP solver, by the L2 controller, formulates an L2 trend filtering problem as in Equation (27) above.

At 607, the ADMM based QP solver, by an L2 CPU, derives a QP problem through dual transformation. At 609, the ADMM based QP solver, by an L2 ALU, solves the QP problem using an ADMM based solution with closed-form updates. At 611, the ADMM based QP solver, by the L2 ALU, uses a previous solution to the QP problem as a warm start. At 613, the ADMM based QP solver, by the L2 ALU, outputs a smoothed path y.

L1 trend filtering is different from L2 trend filtering. The choice of which one to use is subject to application requirements, as the different choices of the distance penalty term will change the property in the output smoothed path.

The LP solver and the QP solver can take different numbers of derivative terms in Equation (1) above. The ADMM based QP solver can also process derivative terms with an L2 norm. The LP solver and the QP solver may be generalized to solve filtering problems considering higher order terms.

Figure 7:
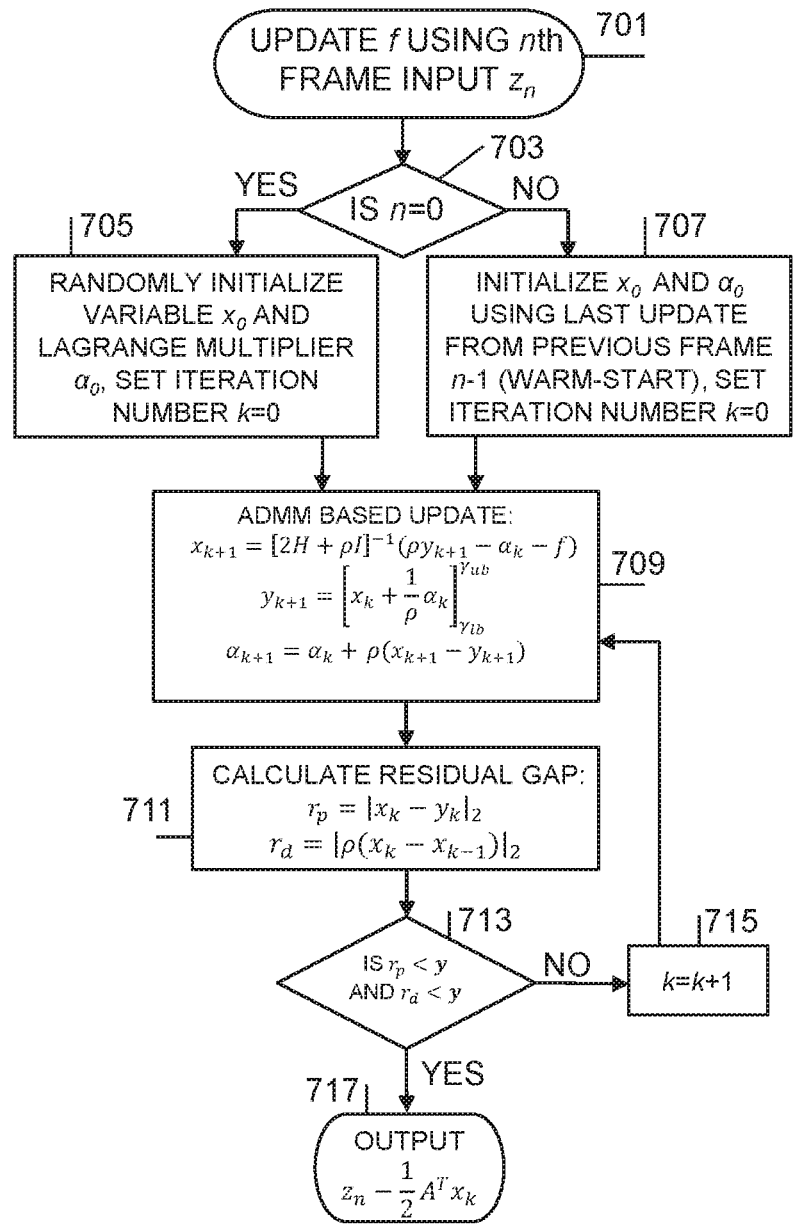
FIG. 7 illustrates a flowchart of a method of an L2 ALU, according to one embodiment.

FIG. 7 illustrates a flowchart of a method of an L2 ALU (e.g., L2 ALU 505 in FIG. 5 and step 609 in FIG. 6), according to an embodiment. At 701, the L2 ALU, updates f using an $n^{th}$ frame input $z_n$.

At 703, the L2 ALU determines if n is equal to 0. At 705, the L2 ALU randomly initializes a variable $x_0$ and a Lagrange multiplier $a_0$, and sets an iteration number k equal to 0 if n is equal to 0. At 707, the L2 ALU initializes $x_0$ and $a_0$ using the last update from a previous frame n−1 and sets the iteration number k equal to 0 if n is not equal to 0.

At 709, the L2 ALU determines an ADMM based update according to Equations (28), (29), and (30):

$$x_{k+1} = [2H+\rho I]^{-1}(\rho y_{k+1} - \alpha_k - f) \quad (28)$$

$$y_{k+1} = \left[x_k + \frac{1}{\rho}\alpha_k\right]_{\gamma_{lb}}^{\gamma_{ub}} \quad (29)$$

$$\alpha_{k+1} = \alpha_k + \rho(x_{k+1} - y_{k+1}) \quad (30)$$

At 711, the L2 ALU calculates a residual gap according to Equations (31) and (32):

$$r_p=|x_k-y_k|_2 \quad (31)$$

$$r_d=|\rho(x_k-x_{k-1})|_2 \quad (32)$$

At 713, the L2 ALU determines if $r_p<\gamma$ and $r_d<\gamma$. At 715, the L2 ALU sets the iteration number k to k+1 if it is not true that $r_p<\gamma$ and $r_d<\gamma$. At 717, the L2 ALU outputs $z_n-\frac{1}{2}A^T x_k$ if $r_p<\gamma$ and $r_d<\gamma$.

Figure 8:
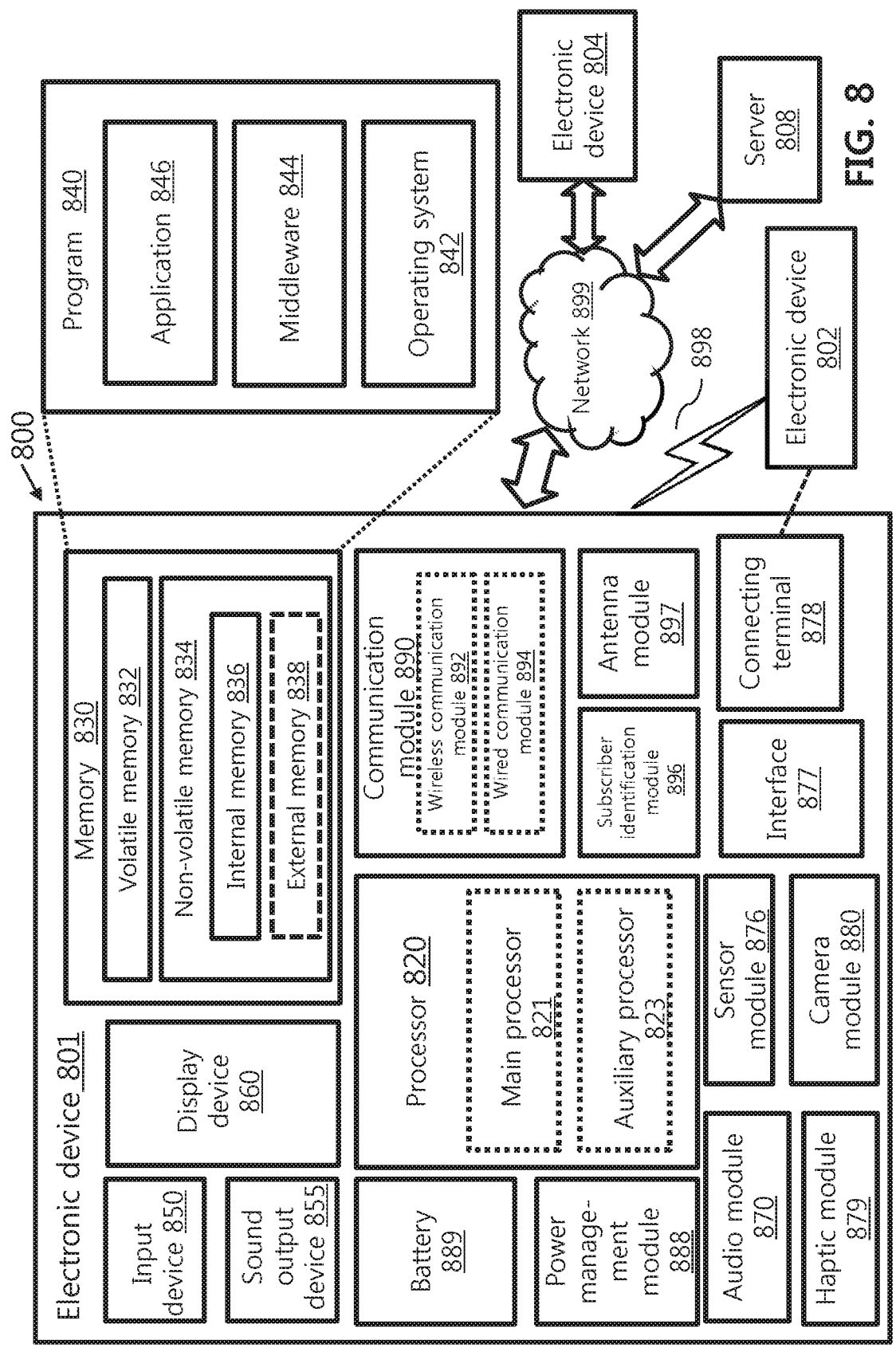
FIG. 8 illustrates a block diagram of an electronic device in a network environment, according to one embodiment.

FIG. 8 illustrates a block diagram of an electronic device in a network environment, according to one embodiment. An electronic device 801 in a network environment 800 may communicate with an electronic device 802 via a first network 898 (e.g., a short-range wireless communication network), or an electronic device 804 or a server 808 via a second network 899 (e.g., a long-range wireless communication network). According to one embodiment, the electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In one embodiment, at least one (e.g., the display device 860 or the camera module 880) of the components may be omitted from the electronic device 801, or one or more other components may be added to the electronic device 801. In one embodiment, some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute, for example, software (e.g., a program 840) to control at least one other component (e.g., a hardware or a software component) of the electronic device 801 coupled with the processor 820, and may perform various data processing or computations. According to one embodiment, as at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. According to one embodiment, the processor 820 may include a main processor 821 (e.g., a CPU or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to one embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to one embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to one embodiment, the audio module 870 may obtain the sound via the input device 850, or output the sound via the sound output device 855 or a headphone of an external electronic device (e.g., electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to one embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to one embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to one embodiment, the connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. According to one embodiment, the haptic module 879 may include, for example, a motor, a piezoelectric element, or an electrical stimulator.

The camera module 880 may capture a still image or moving images. According to one embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to one embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. According to one embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN))). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to one embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to one embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

One embodiment may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

Figure 9:
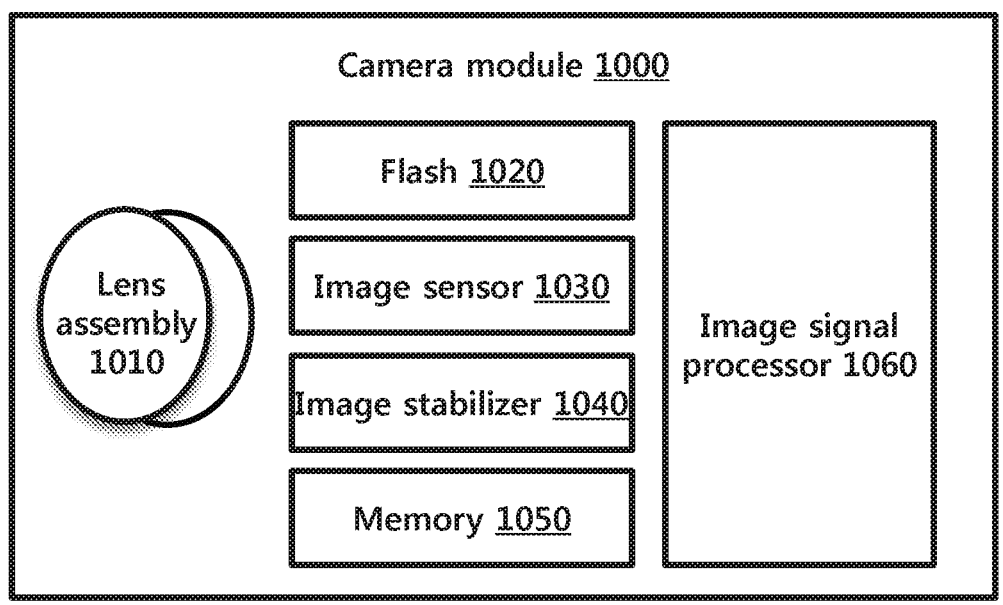
FIG. 9 illustrates a block diagram of a camera module, according to one embodiment.

FIG. 9 illustrates a block diagram of a camera module, according to one embodiment. A camera module 1000 may include a lens assembly 1010, a flash 1020, an image sensor 1030, an image stabilizer 1040, a memory 1050 (e.g., a buffer memory), or an image signal processor 1060. The lens assembly 1010 may collect light emitted or reflected from an object whose image is to be taken. The lens assembly 1010 may include one or more lenses. According to one embodiment, the camera module 1000 may include a plurality of lens assemblies 1010. In this case, the camera module 1000 may form, for example, a dual camera, a 360-degree camera, or a spherical camera. Some of the plurality of lens assemblies 1010 may have the same lens attribute (e.g., view angle, focal length, auto-focusing, f number, or optical zoom), or at least one lens assembly may have one or more lens attributes that are different from those of another lens assembly. The lens assembly 1010 may include, for example, a wide-angle lens or a telephoto lens.

The flash 1020 may emit light that is used to reinforce light reflected from an object. According to one embodiment, the flash 1020 may include one or more light emitting diodes (LEDs) (e.g., a red-green-blue (RGB) LED, a white LED, an infrared (IR) LED, or an ultraviolet (UV) LED) or a xenon lamp. The image sensor 1030 may obtain an image corresponding to an object by converting light emitted or reflected from the object and transmitted via the lens assembly 1010 into an electrical signal. According to one embodiment, the image sensor 1030 may be selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 1030 may be implemented using, for example, a charged coupled device (CCD) sensor or a complementary metal oxide semiconductor (CMOS) sensor.

The image stabilizer 1040 may move the image sensor 1030 or at least one lens included in the lens assembly 1010 in a particular direction, or control an operational attribute (e.g., adjust the read-out timing) of the image sensor 1030 in response to the movement of the camera module 1000 or the electronic device 801 including the camera module 1000. This allows compensating for at least part of a negative effect (e.g., image blurring) by the movement on an image being captured. According to one embodiment, the image stabilizer 1040 may sense such a movement by the camera module 1000 or the electronic device 801 using a gyro sensor or an acceleration sensor disposed inside or outside the camera module 1000. According to one embodiment, the image stabilizer 1040 may be implemented, for example, as an optical image stabilizer.

The memory 1050 may store, at least temporarily, at least part of an image obtained via the image sensor 1030 for a subsequent image processing task. For example, if image capturing is delayed due to shutter lag or multiple images are quickly captured, a raw image obtained (e.g., a Bayer-patterned image, a high-resolution image) may be stored in the memory 1050, and its corresponding copy image (e.g., a low-resolution image) may be previewed via the display device 860. Thereafter, if a specified condition is met (e.g., by a user's input or system command), at least part of the raw image stored in the memory 1050 may be obtained and processed, for example, by the image signal processor 1060. According to one embodiment, the memory 1050 may be configured as at least part of the memory 830 or as a separate memory that is operated independently from the memory 830.

The image signal processor 1060 may perform one or more image processing with respect to an image obtained via the image sensor 1030 or an image stored in the memory 1050. The one or more image processing may include, for example, depth map generation, 3D modeling, panorama generation, feature point extraction, image synthesizing, or image compensation (e.g., noise reduction, resolution adjustment, brightness adjustment, blurring, sharpening, or softening). Additionally or alternatively, the image signal processor 1060 may perform control (e.g., exposure time control or read-out timing control) with respect to at least one (e.g., the image sensor 1030) of the components included in the camera module 880. An image processed by the image signal processor 1060 may be stored in the memory 1050 for further processing, or may be provided to an external component (e.g., the memory 830, the display device 860, the electronic device 802, the electronic device 804, or the server 808) outside the camera module 1000. According to one embodiment, the image signal processor 1060 may be configured as at least part of the processor 820, or as a separate processor that is operated independently from the processor 820. If the image signal processor 1060 is configured as a separate processor from the processor 820, at least one image processed by the image signal processor 1060 may be displayed, by the processor 820, via the display device 860 as it is or after being further processed.

According to one embodiment, the electronic device 801 may include a plurality of camera modules 880 having different attributes or functions. In this case, at least one of the plurality of camera modules 880 may form, for example, a wide-angle camera and at least another of the plurality of camera modules 880 may form a telephoto camera. Similarly, at least one of the plurality of camera modules 880 may form, for example, a front camera and at least another of the plurality of camera modules 880 may form a rear camera.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
    an L1 controller configured to receive a raw data series z to be smoothed, receives weights $w_0$, $w_1$, $w_2$, and $w_3$ to control smoothness of an output path, and formulate an L1 trend filtering problem, where L1 represents a formulation based on L1 norm cost;
    an L1 central processing unit (CPU) connected to the L1 controller and configured to transform the L1 trend filtering problem to a primal-dual linear programming (LP) optimization problem pair; and
    an L1 arithmetic logic unit (ALU) connected to the L1 CPU and configured to solve a primal problem of the primal-dual problem pair with an extended full tableau simplex method.

2. The apparatus of claim 1, wherein the L1 ALU is further configured to use a previous solution of the primal-dual LP optimization problem pair as a warm start.

3. The apparatus of claim 1, wherein the L1 controller is further configured to formulate the L1 trend filtering problem as $$\min_{z-r_{th} \leq y \leq z+r_{th}} w_0\|y-z\|_1^1 + w_1\|D_1 y\|_1^1 + w_2\|D_2 y\|_1^1 + w_3\|D_3 y\|_1^1$$

where y is the smoothed output path, $D_i$ is an $i^{th}$ order differential matrix, and $r_{th}$ is a threshold vector.

4. The apparatus of claim 1, wherein the L1 ALU is further configured to solve the primal problem of the primal-dual LP optimization problem pair with an extended full tableau simplex method as follows:

| $-c_B^T B^{-1} b$ | $c - c_B^T B^{-1} A$ | $-c_B^T B^{-1}$ |
|---|---|---|
| $B^{-1} b$ | $B^{-1} A$ | $B^{-1}$ | where A is a fat matrix, c is a column matrix, B is a basis matrix, T indicates a transposition of a matrix, and b=Ax, and x is a vector.

5. The apparatus of claim 1, wherein the L1 ALU is further configured to solve the primal problem of the primal-dual problems by updating c using a $k^{th}$ frame input $z_k$, where k is an integer, determining if k is equal to 0, initializes the full tableau simplex method using simplex initialization if it is determined that k is equal to 0, initializing the extended full tableau simplex method with a warm start of a last update of the extended full tableau simplex method if k is determined to not be equal to 0, determining a current extended full tableau simplex method, determining if a cost $c - c_B^T B^{-1} A$ is all non-negative, outputting $y^* = -[-c_B^T B^{-1}]^T$ if the cost $c - c_B^T B^{-1} A$ is determined to be all non-negative, determining an entering column j with $\bar{c}_j < 0$ if the cost $c - c_B^T B^{-1} A$ is not determined to be all non-negative, determining if $u = B^{-1} A_j$ is non-positive, determining an unbounded solution if $u=B^{-1}A_j$ is non-positive, determining an exiting column j that gives a smallest $x_{B(i)}/u_i$ among all positive $u_i$ if $u=/B^{-1}A_j$ is not non-positive, and performing an elementary row operation and updating the extended full tableau simplex method.

6. A method, comprising:
receiving, by an L1 controller, a raw data series z to be smoothed, receiving weights $w_0$, $w_1$, $w_2$, and $w_3$ to control smoothness of an output path, and formulating an L1 trend filtering problem, where L1 represents a formulation based on L1 norm cost;
transforming, by an L1 central processing unit (CPU) connected to the L1 controller, the L1 trend filtering problem to a primal-dual linear programming (LP) optimization problem pair; and
solving, by an L1 arithmetic logic unit (ALU) connected to the L1 CPU, a primal problem of the primal-dual problem pair with an extended full tableau simplex method.

7. The method of claim 6, further comprising using, by the L1 ALU, a previous solution of the primal problem as a warm start.

8. The method of claim 6, wherein formulating the L1 trend filtering problem is comprised of formulating the L1 trend filtering problem as $$\min_{z-r_{th} \leq y \leq z+r_{th}} w_0\|y-z\|_1^1 + w_1\|D_1 y\|_1^1 + w_2\|D_2 y\|_1^1 + w_3\|D_3 y\|_1^1$$

where y is the smoothed output path, $D_i$ is an $i^{th}$ order differential matrix, and $r_{th}$ is a threshold vector.

9. The method of claim 6, wherein solving, by the L1 ALU connected to the L1 CPU, a primal problem of the primal-dual problem pair with an extended full tableau simplex method is comprised of solving the primal problem of the primal-dual problem pair with an extended full tableau simplex method as follows:

| $-c_B^T B^{-1} b$ | $c - c_B^T B^{-1} A$ | $-c_B^T B^{-1}$ |
|---|---|---|
| $B^{-1} b$ | $B^{-1} A$ | $B^{-1}$ | where A is a fat matrix, c is a column matrix, B is a basis matrix, T indicates a transposition of a matrix, and b=Ax, and x is a vector.

10. The method of claim 6, wherein solving, by the L1 ALU connected to the L1 CPU, the primal problem of the primal-dual problems with an extended full tableau simplex method is comprised of:
updating c using a $k^{th}$ frame input $z_k$, where k is an integer;
determining if k is equal to 0, initializes the full tableau simplex method using simplex initialization if it is determined that k is equal to 0;
initializing the extended full tableau simplex method with a warm start of a last update of the extended full tableau simplex method if k is determined to not be equal to 0;
determining a current extended full tableau simplex method;
determining if a cost $c - c_B^T B^{-1} A$ is all non-negative, outputting $y^* = -[c_B^T B^{-1}]^T$ if the cost $c - c_B^T B^{-1} A$ is determined to be all non-negative;
determining an entering column j with $\bar{c}_j < 0$ if the cost $c - c_B^T B^{-1} A$ is not determined to be all non-negative;
determining if $u = B^{-1} A_j$ is non-positive;
determining an unbounded solution if $u = B^{-1} A_j$ is non-positive;
determining an exiting column j that gives a smallest $x_{B(i)}/u_i$ among all positive $u_i$ if $u = B^{-1} A_j$ is not non-positive; and
performing an elementary row operation and updating the extended full tableau based on the simplex method.

11. An apparatus, comprising:
an L2 controller configured to receive a raw data series z to be smoothed, receives weights $w_0$, $w_1$, $w_2$, and $w_3$ to control smoothness of an output path, and formulate an L2 trend filtering problem, where L2 represents a formulation based on L2 norm cost;
an L2 central processing unit (CPU) connected to the L2 controller and configured to derive a quadratic programming (QP) problem through dual transformation; and
an L2 arithmetic logic unit (ALU) connected to the L2 CPU and configured to solve the QP problem using an alternating direction method of multipliers (ADMM) based solution with closed-form updates.

12. The apparatus of claim 11, wherein the L2 ALU is further configured to use a previous solution of the ADMM based solution as a warm start.

13. The apparatus of claim 11, wherein the L2 controller is further configured to formulate the L2 trend filtering problem as $$\min_{z-r_{th} \leq y \leq z+r_{th}} w_0\|y-z\|_2^2 + w_1\|D_1 y\|_1^1 + w_2\|D_2 y\|_1^1 + w_3\|D_3 y\|_1^1$$

where y is the smoothed output path, $D_i$ is an $i^{th}$ order differential matrix, and $r_{th}$ is a threshold vector.

14. The apparatus of claim 11, wherein the L2 ALU is further configured to derive a quadratic programming (QP) problem through dual transformation.

15. The apparatus of claim 11, wherein the L2 ALU is further configured to solve the QP problem using an the ADMM based solution with closed-form updates by updating f using an $n^{th}$ frame input $z_n$, determining if n is equal to 0, randomly initializing a variable $x_0$ and a Lagrange multiplier $\alpha_0$, and setting an iteration number k equal to 0 if n is equal to 0, initializing $x_0$ and $\alpha_0$ using a last update from a previous frame n−1 and setting the iteration number k equal to 0 if n is not equal to 0, determining an ADMM based update according to:

$$x_{k+1} = [2H + \rho I]^{-1}(\rho y_{k+1} - \alpha_k - f)$$

$$y_{k+1} = \left[x_k + \frac{1}{\rho}\alpha_k\right]_{\gamma_{lb}}^{\gamma_{ub}}$$

$$\alpha_{k+1} = \alpha_k + \rho(x_{k+1} - y_{k+1})$$

calculating a residual gap according to:

$$r_p = |x_k - y_k|_2$$

$$r_d = |\rho(x_k - x_{k-1})|_2$$

determining if $r_p < \gamma$ and $r_d < \gamma$, setting the iteration number k to k+1 if it is not true that $r_p < \gamma$ and $r_d < \gamma$, and outputting $z_n - \frac{1}{2}A^T x_k$ if $r_p < \gamma$ and $r_d < \gamma$, where $f = 2(Az+B)$, $H = AA^T$, is A a fat matrix, T is a transposition, is a B basis matrix, n is an integer, k is an integer, z is a raw data series, ρ is a weight on a quadratic penalty, $\gamma_{lb}$ is a lower bound threshold, and $\gamma_{lb}$ is an upper bound threshold.

16. A method, comprising:
receiving, by an L2 controller, a raw data series z to be smoothed, where L2 represents a formulation based on L2 norm cost;
receiving, by the L2 controller, weights $w_0$, $w_1$, $w_2$, and $w_3$ to control smoothness of an output path;
formulating, by the L2 controller, an L2 trend filtering problem;
deriving, by an L2 central processing unit (CPU) connected to the L2 controller, a quadratic programming (QP) problem through dual transformation; and
solving, by an L2 arithmetic logic unit (ALU) connected to the L2 CPU, the QP problem using an alternating direction method of multipliers (ADMM) based solution with closed-form updates.

17. The method of claim 16, further comprising, using, by the L2 ALU, a previous solution of the ADMM based solution as a warm start.

18. The method of claim 16, wherein formulating, by the L2 controller, an L2 trend filtering problem as $$\min_{z-r_{th} \leq y \leq z+r_{th}} w_0 \|y-z\|_2^2 + w_1 \|D_1 y\|_1^1 + w_2 \|D_2 y\|_1^1 + w_3 \|D_3 y\|_1^1$$

where y is the smoothed output path, $D_i$ is an $i^{th}$ order differential matrix, and $r_{th}$ is a threshold vector.

19. The method of claim 16, wherein deriving, by the L2 CPU connected to the L2 controller, a quadratic programming (QP) problem through dual transformation.

20. The method of claim 16, wherein solving, by the L2 ALU connected to the L2 CPU, the QP problem using the ADMM based solution with closed-form updates is comprised of:
updating f using an $n^{th}$ frame input $z_n$;
determining if n is equal to 0;
randomly initializing a variable $x_0$ and a Lagrange multiplier $a_0$, and setting an iteration number k equal to 0 if n is equal to 0;
initializing $x_0$ and $a_0$ using a last update from a previous frame n−1 and setting the iteration number k equal to 0 if n is not equal to 0;
determining an ADMM based update according to:

$$x_{k+1} = [2H + \rho I]^{-1}(\rho y_{k+1} - \alpha_k - f)$$

$$y_{k+1} = \left[x_k + \frac{1}{\rho}\alpha_k\right]_{\gamma_{lb}}^{\gamma_{ub}}$$

$$\alpha_{k+1} = \alpha_k + \rho(x_{k+1} - y_{k+1})$$

calculating a residual gap according to:
$r_p = |x_k - y_k|_2$
$r_d = |\rho(x_k - x_{k-1})|_2$
determining if $r_p < y$ and $r_d < y$;
setting the iteration number k to 2 if it is not true that $r_p < y$ and $r_d < y$; and
outputting $z_n - \frac{1}{2}A^T x_k$ if $r_p < y$ and $r_d < y$, where f=2(Az+B), $H=AA^T$, A is a fat matrix, T is a transposition, B is a basis matrix, n is an integer, k is an integer, z is a raw data series, ρ is a weight on a quadratic penalty, $\gamma_{lb}$ is a lower bound threshold, and $\gamma_{lb}$ is an upper bound threshold.

* * * * *